United States Patent [19]

Harpell et al.

[11] Patent Number: 4,681,792
[45] Date of Patent: Jul. 21, 1987

[54] MULTI-LAYERED FLEXIBLE FIBER-CONTAINING ARTICLES

[75] Inventors: Gary A. Harpell, Morristown; Igor Palley, Madison; Dusan C. Prevorsek, Morristown, all of N.J.

[73] Assignee: Allied Corporation, Morris Township, Morris County, N.J.

[21] Appl. No.: 825,037

[22] Filed: Dec. 9, 1985

[51] Int. Cl.⁴ .................................................. B32B 3/06
[52] U.S. Cl. ...................... 428/102; 428/218; 428/246; 428/252; 428/284; 428/226; 428/287; 428/297; 428/298; 428/902; 428/911
[58] Field of Search .............. 428/902, 911, 102, 218, 428/246, 252, 284, 286, 212, 213, 287, 297, 298

[56] References Cited

U.S. PATENT DOCUMENTS

| | | | |
|---|---|---|---|
| 3,841,954 | 10/1974 | Lawler | 428/911 |
| 4,090,005 | 5/1978 | Morgan | 428/911 |
| 4,137,394 | 1/1979 | Meihuizen et al. | 528/502 |
| 4,356,138 | 10/1982 | Kavesh et al. | 264/164 |
| 4,403,012 | 9/1983 | Harpell et al. | 428/290 |
| 4,413,110 | 11/1983 | Kavesh et al. | 526/348.1 |
| 4,440,711 | 4/1984 | Kwon et al. | 264/185 |
| 4,457,985 | 7/1984 | Harpell et al. | 428/224 |
| 4,535,027 | 8/1985 | Kobashi et al. | 428/364 |
| 4,550,044 | 10/1985 | Rosenberg et al. | 428/911 |

FOREIGN PATENT DOCUMENTS 3004699 8/1980 Fed. Rep. of Germany .
2051667 1/1981 United Kingdom .

OTHER PUBLICATIONS

"The Application of High Modulus Fibers for Ballistic Protection" R. C. Laible et al. J. Macromel Sci. Chem. A7(1) pp. 295-322 (1973).
"Ballistic Materials and Penetration Mechanics" Elseview Scientific Publishing Co. 1980.

Primary Examiner—James J. Bell
Attorney, Agent, or Firm—Gus T. Hampilos; Richard C. Stewart; Gerhard H. Fuchs

[57] ABSTRACT

The present invention provides improved, flexible articles of manufacture comprising a plurality of first flexible layers arranged in a first portion of said article, each of said first layers consisting essentially of fibers, the fibers of each of said flat layers comprising fibers having a tensile modulus of at least about 300 g/denier and a tenacity of at least about 15 g/denier and a plurality of second flexible layers arranged in a second portion of said article, each of said second flexible layers comprising fibers, the resistance to displacement of fibers in each of said second flexible layers being greater than the resistance to displacement of fibers in each of said first flexible layers.

47 Claims, 2 Drawing Figures

MULTI-LAYERED FLEXIBLE FIBER-CONTAINING ARTICLES

BACKGROUND OF THE INVENTION

Flexible, multi-layered, fiber-containing articles, and especially flexible ballistic resistant articles such as bulletproof vests, raincoats, curtains and blankets containing high strength fibers are known. Fibers conventionally used in forming flexible multi-layered fiber-containing articles include aramid fibers such as poly (phenylenediamine terephthalamide), nylon fibers, glass fibers, metal fibers and the like. In articles such as bulletproof vests or parts of vests, the fibers are ordinarily arranged in a network, such as a woven or a knitted fabric.

A number of properties are generally considered to be necessary for high strength fiber to be useful as a component of a ballistic resistant article. Four of these factors, listed by John E. E. Hansen and Roy C. Laible in a paper presented at the "Fiber Frontiers" ACS Conference, June 10–12, 1974 entitled "Flexible Body Armor Materials," are high modulus, high melting point, high strength and/or work-to-rupture values, and high resistance to cutting or shearing. With regard to melting point, in "the Application of High Modulus Fibers for Ballistic Protection," R. C. Laible et al., J. Macromel. Sci. Chem., A7(1), pp. 295–322, 1973, at p. 298, it is disclosed that fiber material must have a high degree of heat resistance to be useful as a ballistic resistant article; for example, a polyamide material with a melting point of 255° C. was deemed to possess better ballistic impact resistance properties than did a polyolefin fiber with equivalent tensile properties but a lower melting point. Consequently, today's soft armor (e.g., bulletproof vests and raincoats) is essentially formed from high melting point materials, predominantly aramid fibers.

Notwithstanding the required properties noted above, U.S. Pat. Nos. 4,403,012 and 4,457,985 disclose flexible ballistic resistant articles such as vests comprising networks of high molecular weight polyolefin fibers, and rigid and semi-rigid ballistic articles comprising composites including such fibers embedded in different matrices (such as olefin polymers and copolymers, unsaturated polyester resins, epoxy resins, and other resins curable below the melting point of the fiber). The products disclosed in these patents possess superior ballistic resistance as compared to the ballistic resistance of articles composed of aramid fibers.

We have discovered improved flexible multi-layered articles which possess unexpectedly superior ballistic resistant properties as compared to prior art armor products.

BRIEF DESCRIPTION OF THE INVENTION

The present invention provides improved, flexible articles of manufacture comprising a plurality of first flexible layers arranged in a first portion of said article, each of said first layers consisting essentially of fibers, the fibers of each of said flat layers comprising fibers having a tensile modulus of at least about 300 g/denier and a tenacity of at least about 15 g/denier and a plurality of second flexible layers arranged in a second portion of said article, each of said second flexible layers comprising fibers, the resistance to displacement of fibers in each of said second flexible layers being greater than the resistance to displacement of fibers in each of said first flexible layers. More particularly, the present invention is directed to improved, flexible ballistic resistant articles wherein the plurality of first flexible layers are arranged so as to be exposed to a ballistic impact prior to the plurality of second flexible layers which, unexpectedly, enhances the ballistic performance of the article.

The invention is further directed to an article of manufacture comprising a plurality of first flexible layers arranged in a first portion of said article, each of said first flexible layers comprising polyethylene fibers having a weight average molecular weight of at least about 500,000, a modulus of at least about 500 g/denier and a tenacity of at least about 15 g/denier, and a plurality of second flexible layers arranged in a second portion of said article, each of said second flexible layers being substantially free of polyethylene fiber, the resistance to displacement of fibers in each of said second flexible layers being greater than the resistance to displacement of fibers in each of said first flexible layers.

The invention is further directed to an article of manufacture comprising a plurality of first flexible layers arranged in a first portion of said article, at least one of said first flexible layers consisting essentially of uncoated polyolefin fiber and comprising fiber having a tensile modulus of at least about 300 g/denier and a tenacity of at least about 15 g/denier, and a plurality of second flexible layers arranged in a second portion of said article, at least one of said second flexible layers comprising polyolefin fiber and a material selected from the group of polymers having ethylene or propylene crystallinity, polymers having a modulus of less than about 6,000 psi, and mixtures thereof, the resistance to displacement of fibers in each of said second flexible layers being greater than the resistance to displacement of fibers in each of said first flexible layers.

The invention is further directed to an article of manufacture comprising a plurality of flexible, fiber-containing layers, said article having an RIR value of at least about 1.25, wherein the RIR value is the value of $RI_1$ divided by $RI_2$ where $RI_1$ = the higher resistance index, RI, value and $RI_2$ is the lower resistance index, RI, value, the resistance index RI being determined from the equation $$RI = \sum_{i=1}^{i=n} F_i AD_i$$

where n = number of consecutive impact effective layers (beginning with the first impact effective layer nearest a face of the article) constituting substantially one half of the areal density of all of the impact effective layers of the article, an impact effective layer being defined as any fiber-containing layer of said article wherein substantially all of said fibers have a tenacity of at least about 15 g/denier or any fiber-containing layer of said article having a specific energy absorption value of at least about one third of the highest specific energy absorption value calculated for any layer of the article; $F_i$ = the resistance to fiber displacement value of the $i^{th}$ layer; and $AD_i$ = the areal density of the $i^{th}$ layer, $F_i$ being determined by the equation $$F_i = \frac{\sum_{i=1}^{i=n} b}{nx}$$

where $b_i$ = the number of broken fibers in the $i_{th}$ layer produced by the impact of a ballistic threat having an impact velocity of at least about 90 percent of the $V_{50}$ value of an article constructed essentially from 3n $i^{th}$ layers, n = the number of layers removed and individually inspected to determine the number of broken fibers in each layer 1 through n, and x = the number of fibers within the impact area of each layer 1 through n, the impact area being defined as an area of the layer substantially equal to the initial cross sectional area of the ballistic threat (measured in a plane normal to the direction of travel of the ballistic threat).

The invention is further directed to an article of manufacture comprising a plurality of fiber containing layers, each fiber containing layer having an F value different from any other of said fiber-containing layers, wherein F =

$$F = \frac{\sum_{i=1}^{i=n} b_i}{nx}$$

where $b_i$ = the number of broken fibers in the $i^{th}$ layer produced by the impact of a ballistic threat having an impact velocity of at least about 90 percent of the $V_{50}$ value of an article constructed essentially from 3n $i^{th}$ layers, n = the number of layers removed and individually inspected to determine the number of broken fibers in each layer 1 through n, and x = the number of fibers within the impact area of each layer 1 through n, the impact area being defined as as area of the layer substantially equal to the initial cross sectional area of the ballistic threat (measured in a plane normal to the direction of travel of the ballistic threat).

DETAILED DESCRIPTION OF THE INVENTION

The present invention is directed to improved flexible, multilayered articles of manufacture comprising a plurality of fiber-containing layers. The articles have particular utility in the field of ballistic protection as they may be designed as, for example, vests or linings of a raincoats.

For purposes of the present invention, fiber is defined as an elongated body, the length dimension of which is much greater than the dimensions of width and thickness. Accordingly, the term fiber as used herein includes a monofilament elongated body, a multifilament elongated body, ribbon, strip, and the like having regular or irregular cross sections. The term fibers includes a plurality of any one or combination of the above.

Fiber which can be used for this invention includes a variety of known fiber such as aramid fiber (especially Kevlar ® fiber), nylon fiber (such as nylon 6 or nylon 6,6), polyolefin fiber (such as polyethylene and polypropylene), polyethylene terephthalate fiber, polyvinyl alcohol fiber and polyacrylonitrile fiber, among others. Fibers having useful ballistic resistance exhibit a modulus of at least about 300 g/denier and/or an energy-to-break of at least about 22 joules/g. Especially useful for this invention is ultrahigh molecular weight polyethylene fiber, highly orientated ultrahigh molecular weight polypropylene fiber, highly oriented polyvinyl alcohol fiber, ultrahigh molecular weight polyacrylonitrile fiber and combinations thereof. U.S. Pat. Nos. 4,413,110, 4,440,711, and 4,535,027 generally discuss such highly oriented fibers, and the disclosures of these patents are hereby incorporated by reference to the extent not inconsistent herewith.

In the case of polyethylene, particularly useful fibers are those highly oriented fibers of weight average molecular weight of at least about 500,000, preferably at least about 1,000,000 and more preferably between about 2,000,000 and about 5,000,000. Known as extended chain polyethylene (ECPE) fiber, such fiber may be produced from polyethylene solution spinning processes described, for example, in U.S. Pat. No. 4,137,394 (to Meihuisen et al.) or U.S. Pat. No. 4,356,138 (to Kavesh et al.), or spun from a solution to form a gel structure as described in German Off. No. 3,004,699, G.B. Pat. No. 2,051,667, and especially as described in U.S. application Ser. No. 572,607 of Kavesh et al., filed Jan. 20, 1984 a continuation of U.S. application Ser. No. 359,020, which in turn is a continuation-in-part of Ser. No. 259,266). (See EPA 64,167, published Nov. 10, 1982). As used herein, the term polyethylene shall mean a predominantly linear polyethylene material that may contain minor amounts of chain branching or comonomers not exceeding about 5 modifying units per 100 main chain carbon atoms that may also contain admixed therewith not more than about 25 percent by weight of one or more polymeric additives such as alkene-1-polymers, in particular low density polyethylene, polypropylene, or polybutylene, copolymers containing mono-olefins as primary monomers, oxidized polyolefins, grafted polyolefin copolymers and polyoxymethylenes, or low molecular weight additives such as anti-oxidants, lubricants, ultraviolet screening agents, colorants and the like which are commonly incorporated therewith. Depending upon the fiber-forming technique, the draw ratio and temperatures and other conditions, a variety of properties can be imparted to these fibers. The tenacity of the fiber is ordinarily at least about 15 g/denier, preferably at least about 20 g/denier, more preferably at least about 25 g/denier, and most preferably at least about 30 g/denier. The tensile modulus of the fiber, as measured by an instron tensile machine, is ordinarily at least about 300 g/denier, preferably at least about 500 g/denier, more preferably at least about 1000 g/denier, and most preferably at least about 1500 g/denier. Moreover, the energy to break the fibers is ordinarily at least about 22 joules/g, preferably at least about 30 joules/g, and most preferably at least about 35 joules/g. These highest values for tensile modulus, energy to break and tenacity are generally obtainable only by employing solution spun or gel fiber processes. In addition, these higher values of modulus, energy to break and tenacity are particularly useful in forming multilayered, flexible ballistic resistant articles. Moreover, many ECPE fibers have melting points higher than the melting point of the polymers from which they were formed. Thus, for example, whereas ultrahigh molecular weight polyethylenes of 500,000, 1,000,000, and 2,000,000 generally have melting points in bulk of 138° C., the ECPE made of these materials have melting points from 7° to about 13° C. higher.

In the case of polypropylene, highly oriented polypropylene fiber of weight average molecular weight is at least about 750,000, preferably at least about 1,000,000, and more preferably at least about 2,000,000 are particularly useful. Ultrahigh molecular weight polypropylene may be formed into a reasonable highly oriented fiber by techniques described in various references recited above, and especially by the technique by U.S. Ser. No. 572,609, id., since polypropylene is a much less crystalline material than polyethylene and contains pendant methyl groups, tenacity values achievable with polypropylene are generally substantially lower than the corresponding values for polyethylene. Accordingly, a particularly suitable fiber for use in the present invention would exhibit a tenacity of at least about 8 g/denier (with a preferred tenacity of at least about 11 g/denier), a tensile modulus of at least about 300 g/denier (preferably at least about 400 g/denier) and an energy to break of at least about 22 joules/g. The melting point of polypropylene is generally raised several degrees by the orientation process, such that polypropylene fiber preferably has a melting point of at least about 168° C., more preferably at least about 170° C.

In the case of polyvinyl alcohol (PV-OH), PV-OH fiber of molecular weight of at least about 500,000, preferably at least about 750,000, more preferably between about 1,000,000 and about 4,000,000, and most preferably between about 1,500,000 and about 2,500,000 may be employed in the present invention. Particularly useful PV-OH fiber should have a modulus of at least about 300 g/denier, a tenacity of at least about 7 g/denier (preferably at least about 10 g/denier, more preferably at least about 14 g/denier, and most preferably at least about 17 g/denier), and an energy to break of at least about 22 joules/g. PV-OH fibers having a weight average molecular weight of at least about 500,000, a tenacity of at least about 300 g/denier, a modulus of at least about 10 g/denier, and an energy to break of about 22 joules/g are more useful in producing a ballistic resistant article. PV-OH fiber having such properties can be produced, for example, by the process disclosed in U.S. Pat. application Ser. No. 569,818, filed Jan. 11, 1984, to Kwon et al., and commonly assigned.

In the case of polyacrylonitrile (PAN), PAN fiber of molecular weight of at least about 400,000, and preferably at least 1,000,000 may be employed. Particularly useful PAN fiber should have a tenacity of at least about 10 g/denier and an energy to break of at least about 22 joule/g. PAN fiber having a molecular weight of at least about 400,000, a tenacity of at least about 15–20 g/denier and an energy to break of at least about 22 joule/g is most useful in producing ballistic resistant articles; and such fibers are disclosed, for example, in U.S. Pat. No. 4,535,027.

In its broadest aspect, the invention is directed to fiber-containing articles of manufacture comprising a plurality of first fiber-containing layers arranged in a first portion of said article, said first layers comprising fibers having a tensile modulus of at least about 300 g/denier and a tenacity of at least about 15 g/denier, and a plurality of second fiber-containing layers arranged in a second portion of said article, wherein the resistance to displacement of fiber arranged in the plurality of second layers is greater than the resistance to displacement of fiber in said plurality of first layers. The term "resistance to displacement of fiber" (or "fiber resistance to displacement") as used herein is defined as the force required to displace fiber in a given direction in the plane defined by the major face of the layer relative to an adjacent fiber in the same layer. In the most preferred use of the article of the present invention, the force which may displace the fiber of a given layer would be generated by a projectile, e.g., a bullet or shrapnel, impacting the fiber layer. The articles are particularly useful as a "bulletproof" vest material or as a "bulletproof" lining for example, of a raincoat because of the flexibility of the article and its enhanced ballistic resistance.

The flexibility of the multilayered articles of the present invention can be demonstrated by clamping a 30 cm square sample of the article horizontally along one side edge and measuring the amount of drape of the article (the amount of drape being measured by the distance between the level of the clamped side edge and the opposite edge). For flexible articles, the amount of drape is ordinarily at least about 10 cm, preferably at least about 15 cm.

The enhanced ballistic resistance of the article results from constructions described hereinbelow. Properly constructed articles are objectively determined by the resistance index ratio (RIR) which has a value of at least about 1.25. Moreover, applicants have discovered the unexpected phenomenon of an increase in the ballistic protection afforded by the articles described herein when the article is arranged such that the plurality of layers having the lesser fiber resistance to displacement are subjected to impact by the ballistic threat prior to the plurality of layers having the greater fiber resistance to displacement.

Applicants have also discovered the principal factors which influence the resistance to displacement of fiber in a layer. They include:
(a) fiber geometry;
(b) fiber properties;
(c) matrix properties and volume fraction of matrix;
(d) fiber network structure; and,
(e) layer interaction.

The geometry of the fiber (e.g., the cross-sectional design taken along the longitudinal axis thereof and the fiber denier) will influence the resistance to displacement of fiber in a layer. For example, fiber in the form of ribbon or tape (i.e., fiber having a ratio of width to thickness, the cross sectional aspect ratio, of greater than about 5:1) exhibits an increased surface area over one set of opposed surfaces of the fiber relative to the surface area over the other set of opposed surfaces of the fiber. The faces exhibiting the increased surface area can be arranged in a layer in a manner so as to increase the resistance to displacement of fiber in the layer, such as by arranging the tape or ribbon so that those faces define planes generally parallel to the plane of the major surface of the layer. Moreover, if the network comprises ribbon or tape arranged in an overlapping relationship (e.g., a plain or basket weave arrangement) the surface area of contact between adjacent fibers in the layer will increase, thus increasing the resistance to displacement of fiber due, in part, to the increased frictional forces created by the increased contact surface area. In other embodiments, the fiber geometries could be controlled to provide a mechanical interlock between adjacent fibers: for example, the cross sectional geometry of the fibers could be bracket-shaped or star-shaped with adjacent fibers arranged so as to have protruding arms in an interlocking relationship, thus increasing the fiber resistance to displacement. Fiber denier is another important feature which can substantially influence fiber resistance to displacement. In general, lower denier fiber is more resistant to displacement in a layer than higher denier fiber in the same layer. Moreover, as disclosed in U.S. Ser. No. 710,340, to Harpell et al., if the fiber denier in a layer is less than about 500, the ballistic resistance of the layer is further enhanced. Most preferably, fiber denier of between about 50 and about 300 is employed to achieve maximum ballistic protection.

The fiber mechanical, chemical, electrical and surface properties are other contributing factors which influence the ability of the fiber to resist displacement. Fiber modulus, tenacity, and energy to break can influence the tendency for displacement of a fiber. For example, applicants have discovered that the modulus of the fiber will significantly affect the tendency of the fiber to displacement: generally, the higher the modulus of the fiber, the greater the tendency for the fiber to be displaced. Similarly, the higher the value of the energy to break the fiber, the greater the tendency of the fiber toward displacement. Moreover, chemical properties such as the fiber composition will influence the ability of the fiber to adhere to other fibers: the greater the ability to adhere to adjacent fibers, the greater the fiber resistance to displacement. For example, the resistance to displacement of ECPE fiber is generally less than Nylon and Kevlar fiber, all other factors being equal. Additionally, electrical properties such as magnetic fields which may be induced into the fiber can function to increase the attractive forces between fibers and, consequently, increase the fiber resistance to displacement.

In many embodiments of the present invention, fiber arranged in a layer will be coated with a material or embedded in a matrix. We have discovered that the use of a coating material or matrix comprising an elastomer and having a modulus of less than about 6,000 psi, preferably less than 2500 psi, and more preferably less than 1000 psi will increase the resistance to displacement of ECPE fiber. Particularly useful matrix materials are those elastomeric materials disclosed in U.S. Ser. No. 704,848, filed Feb. 25, 1985, and the continuation-in-part thereof U.S. Ser. No. 825,114, filed concurrently herewith, both to Harpell et al. and commonly assigned. With respect to the feature of coating fibers, the amount of elastomer-containing coating can be up to about 12% by weight of fiber. In general, the higher the content, the greater the fiber resistance to displacement. Additionally, in U.S. Ser. No. 554,171, to Harpell et al. and commonly assigned, it is disclosed that coating ECPE fibers with a polymer having ethylene or propylene crystallinity not only increases the transverse strength of the fiber but also increases the ability of the fiber to adhere to different matrices (e.g., polyethylene or polypropylene). Thus, in general, the more adherent the fiber to the matrix, the greater the resistance to displacement of the fiber in the layer.

With respect to the volume fraction of elastomer containing matrix present in the layer, the volume, fraction of the matrix should be less than about 70%, and preferably less than about 40%. Most preferably, the volume fraction of matrix is limited to that fraction with substantially completely embeds the fiber. That fraction will, of course, depend upon such factors as yarn denier, fabric construction, etc.

The fiber layer construction also influences the resistance to displacement of the fibers in the layer. By fiber layer construction, we consider such features as, for example, consolidated v. non-consolidated layers, heat set v. non-heat set layers, twisted fiber v. non-twisted fiber-containing layers, woven v. non-woven layers, weave type and density, and fiber density. As general rules, when comparing fiber of substantially the same geometry and properties, consolidated layers exhibit increased resistance to fiber displacement as compared to non-consolidated layers; heat set layers exhibit increase resistance to fiber displacement as compared to non-heat set layers; woven layers exhibit a higher resistance to fiber displacement as compared to non-woven layers; as between woven layers, the weave type influences the resistance to fiber displacement with layers having a plain weave having a greater resistance than basket weave having a greater resistance than satin weave having a greater resistance than non-crimped weave; and directly related to the weave type is weave density within a given type of weave, wherein the greater the density of the weave, the greater the resistance to displacement of fibers in that layer.

Layer interaction is another factor which can influence the resistance to displacement of fibers in a given layer. Layer interaction can be enhanced by, for example, stitching together multiple layers which generally increases the resistance to displacement of fibers in all layers. Moreover, providing adjacent layers so as to increase the frictional interaction between the layers increases the resistance to displacement of fibers in one or both layers. The increased interaction between adjacent layers can also be accomplished by such methods as varying the fiber composition used in adjacent layers (e.g., a polyethylene layer adjacent an aramid layer will increase, the resistance to fiber displacement in the polyethylene layer as compared to the effect of interaction between adjacent polyethylene layers), arranging coated layers adjacent non-coated layers (e.g., polyethylene fiber provided with an elastomeric or low modulus coating arranged adjacent a non-coated polyethylene fiber containing layer will increase the resistance to displacement of fibers in the non-coated layer), or consolidated rubber coated layers adjacent consolidated uncoated layers.

Having described the principle factors which influence fiber resistance to displacement in a given layer and general rules which indicate how these factors influence fiber resistance to displacement in a given layer, it is necessary to objectively evaluate the relative, fiber resistance to displacement as between layers of different constructions, compositions, etc.; for example, comparing a woven polyethylene layer with a coated fiber non-woven layer with a woven aramid layer. Such an objective comparison is necessary to insure proper construction of the final multilayered fabric. Consequently, we have developed a general technique for evaluating the relative fiber resistance to displacement of each layer employed in a multi-layered article designed in accordance with our invention.

Fiber layers can be objectively ranked according to fiber resistance to displacement in accordance with the following procedure. Initially, a ballistic threat is defined with respect to the projectile's physical characteristics and its impact velocity. Thereafter, by routine experimentation, the required number of layers of a given construction (composition, etc.) are determined to achieve a $V_{50}$ approximately equal to the ballistic threat of interest (using a standard, non-deformable fragment of the same cross section area, taken normal to the direction of travel of the fragment, as the initial cross sectional area of the ballistic threat of interest; see, R. C. Laible, "*Ballistic Materials and Penetration Mechanics,*" Elsevier Scientific Publishing Co., 1980, pp. 51-2 for a list of standard, non-deformable fragments used to simulate actual ballistic threats). A multi-layered article is then fabricated with the predetermined number of layers of the given construction and is subjected to impact by the ballistic threat at about the $V_{50}$ (at least 90% of the $V_{50}$). After the impact, the multi-layered article is examined by removing, beginning with the layer receiving the initial impact from the ballistic threat, approximately one third of the total number of layers of the multilayered article. For each removed layer, the number of fibers broken by the impact of the ballistic threat are counted and summed for all removed layers. This summed value is compared to the total number of fibers within the impact area of each layer removed (defined by the initial cross sectional area of the ballistic threat measured normal to the direction of travel of the threat) for all removed layers. The ratio (or fraction) of broken fibers to the number of fibers in the impact area is designated F. Expressing F mathematically, $$F = \frac{\sum_{i=1}^{i=n} b_i}{nx} \quad (1)$$

where $b_i$ = the number of broken fibers produced by the impact of the ballistic threat in the $i^{th}$ layer, n = the number of layers removed and individually imported and x = the number of fibers within the impact area.

The larger the value of F, the greater the fiber resistance to displacement in a layer of that construction (composition, etc). With this information, one can fabricate a multitude of multilayered articles which are within the scope of the invention. For example, one can easily fabricate a multi-layered article having an increasing fiber resistance to displacement from the initial impact side of the article to the remote side of the article which, as noted heretofore, yields unexpectedly improved ballistic resistance as compared to a structure comprising the same layers but not so designed. It should be understood that this construction can be characterized as a multilayered article having a first portion comprising a plurality of first layers and a second portion comprising a plurality of second layers, where the resistance to displacement of fibers in one portion is greater than in the other portion.

Figure 1:
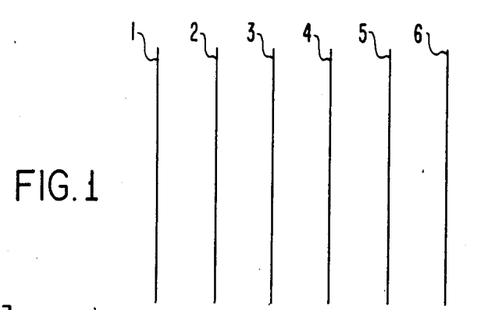
FIG. 1 schematically illustrates a six layered article constructed in accordance with applicants' invention.

While the approach described above is quite useful in developing article constructions exhibiting unique impact resistant properties, applicants' discovery that a change in the fiber resistance to displacement in one portion of the structure as compared to another portion of the structure is not fully appreciated from the above-described approach. Consider, for example, a multi-layered article as shown in FIG. 1 having the following construction: layer 1, with a F value of 0.1; layer 2, with a F value of 0.3; layer 3, with a F value of 0.1; layer 4, with a F value of 0.2; layer 5, with a F value of 0.4; and layer 6, with a F value of 0.1. Using the F value to design the article, it would be expected that, to achieve unexpectedly improved ballistic resistance, the article should be constructed in sequence as (1/3/6), 4, 2, 5 with (1/3/6) defining the initial impact side of the article. While such a construction would certainly fall within the scope of applicants' invention and would be the most preferred construction, the structure illustrated in FIG. 1 would also be within the scope of applicants' invention.

In order to determine whether the article in FIG. 1 is within the scope of the invention, applicants have developed the following procedure. For a given multilayered article, each layer having a known F value (calculated as described above) and a known fiber areal density, one can calculate a value characterized as the resistance index (RI). The RI value is derived from the equation $$RI = \sum_{i=1}^{i=n} F_i AD_i \quad (2)$$

known $F_i$ value for the $i^{th}$ layer of the article, n = number of layers being considered and $AD_i$ is the areal density of the ith layer, subject to the limitation that only layers wherein substantially all of the fibers have a tenacity of at least about 15 g/denier or having a calculated SEA (projectile kinetic energy at $V_{50}$/fiber areal density of the layer) of at least about one third of the most ballistically effective layer (highest SEA value layer) in the article (hereinafter known as impact effective, IE, layers) are considered in determining the RI in accordance with equation (2). An RI value is then calculated for the number of consecutive IE layers (beginning with the first IE layer nearest a face of the multi-layered article) constituting substantially one half of the article areal density (considering only the IE layers in determining the total article areal density). Subsequently, an RI value is calculated for the remaining half of the total article areal density. Where the ratio of the higher RI value to the lower RI value, designated RIR, is greater than about 1.25 (preferably greater than about 1.5, more preferably greater than about 2, and most preferably greater than about 3) the multi-layered article is constructed in accordance with the scope of applicants' invention. Moreover, by arranging the article such that the lower RI value portion functions as the initial impact side and the higher RI portion functions as the remote side, one will achieve unexpectedly superior ballistic performance as compared to the same article arranged in the opposite fashion (where the higher RI value portion functions as the initial impact side).

Referring again to FIG. 1, assuming the areal density of each layer is 1 and each layer is an IE, the RI for one half the total article areal density (layers 1, 2, and 3, which have a total article areal density of 3) is 0.5 from equation (2) and the RI for the remaining half (layers 4, 5, and 6 which have a total article areal density of 3) is 0.7. The ratio of the higher RI value to the lower RI value is 1.4. Thus, the construction of the article is within the scope of applicants' invention. Moreover, if the article were arranged such that layer 1 of FIG. 1 constituted the initial impact layer, the ballistic resistance would be unexpectedly superior to the results obtained from using the article in a reverse fashion.

The proportion of IE layers to the total number of layers of the multilayered article is variable. However, for practical ballistic application, the IE layers should constitute at least about 30% of the multilayered article, preferably at least about 50% of the multilayered article, and most preferably at least about 80% of the multilayered article. In addition, the multilayered article should comprise at least four IE layers in order to offer a practical level of ballistic protection. Of course, the optimum number of layers (and optimum areal density) for effective ballistic protection will depend on the exact level for which protection is required. For example, there exists a ballistic standard for police body armor: Type 1 body armor, which must defeat 0.22 caliber lead bullets at 1050±40 ft/sec and 0.38 calibur lead bullets at 850 ft/sec. Body armor which affords that level of protection was constructed and tested, and the results have been reported in Example 6. In general, for greater ballistic threats (as described in NILECT-STD 0101.00) more layers of fabric and a higher areal density would be required for the fiber employed in Example 6 hereinbelow. However, using ECPE fibers having higher tensile properties, the number of layers and the total areal density required for a given level of protection. Similarly, military specifications exist for Kevlar ®29 fabrics (LP/P DES 32-75B) wherein 50 values against 0.22 caliber fragments must be 1200 ft/sec or greater. It would be expected that their specifications be met by utilizing an article having six layers of rubber coated fabric on the remote side and six layers of uncoated fabric on the impact side.

Ballistic resistant articles can consist essentially of the multilayered article of the present invention or can be combined with or incorporated into other products. For example, "bulletproof" vests may consist essentially of the multilayered article whereas a "bulletproof" raincoat may employ the multilayered article as a lining. In either instance, enhanced ballistic resistance is acheived when the lower RI value portion of the article is arranged so as to be exposed to the impact of the ballistic threat prior to the higher RI value portion. Some preferred construction of multilayered articles within the scope of applicant's invention are as follows:

1. a plurality of layers consisting essentially of polyolefin fiber and a second plurality of layers containing fiber, the fiber of said second plurality of layers having a greater resistance to displacement than the fiber in said first layer and consisting of polyolefin fiber having a fiber denier not greater than about 50% of the fiber denier of said polyolefin fiber of said first layers and not greater than about 500. Preferably, the first layers would have an areal density of at least about 1 kg/m² and would consist essentially of ECPE fiber having a denier of between about 600 and about 1500, a modulus at least about 1000 g/denier (more preferably at least about 1500 g/denier, and most preferably at least about 2200 g/denier), and a tenacity of at least about 30 g/denier (more preferably at least about 35 g/denier, and most preferably at least about 40 g/denier). The second layers would preferably consist essentially of ECPE fiber having a denier of between about 50 and about 300 and having the (preferred, more preferred and most preferred) modulus and tenacity values as required for the first plurality of layers. One particular embodiment contemplated by the invention would be a first plurality of uncoated 1200 denier ECPE fiber-containing plain wover fabrics (18×18 ends/inch) having a total areal density of about 1.5 kg/m² in combination with a second plurality (not the same number of layers as that first plurality) of 300 denier ECPE fiber-containing plain woven fabric (45×45 ends/inch) having a total fiber areal density of between about 1.5-2 kg/m²;

(2) the construction set forth in Example 2; and (3) a 13-layer article having a total areal density of between about 1.5 and 2 kg/m, evenly divided among uncoated ECPE fiber layers and Kraton ® coated ECPE fiber layers, each of the layers using substantially the same fiber.

Having fully described applicants' invention, the following Examples illustrate some of the embodiments within the scope of the invention.

EXAMPLE 1

A multilayered article consisting of 18 layers of Kevlar ® 29 fiber, each layer consisting of 31 ends/inch of 1000 denier Kevlar ® 29 yarn in both the warp and fill directions (Clark-Schwebel Kevlar ® 29 Style 713), was subjected to impact by standard 22 caliber fragments (see R. C. Laible, id) to establish a $V_{50}$ for the multilayered article. The article, of areal density 5.214 kg/m², had a $V_{50}$ value of 1739 ft/sec. and an SEA value of 29.7 j.m²/kg.

A multilayered article consisting of 18 layers of extended chain polyethylene fiber of 118 filaments/yarn (1200 denier) having a modulus of 1250 g/denier, a tenacity of 30 g/denier and an energy break of 60 j/g was subjected to impact by standard 22 caliber fragments. The article consisted of plain woven layers, each with 28 ends/inch in both the warp and fill directions. This article, of areal density 5.00 kg/², had a $V_{50}$ value of 1706 ft/sec. and a SEA value of 29.9 j.m²/kg.

A 15 layer article was constructed in accordance with the present invention as follows: 6 layers of extended chain polyethylene fiber constructed as described above and having an areal density of 2.303 kg/m² were arranged adjacent 9 layers of Clark-Schwebel Kevlar ® 29 Style 713 material having a total areal density of 2.5889 kg/m². The multilayered article, with a total areal density of 4.892 kg/m², was subjected to impact by standard 22 caliber fragments (see R. C. Laible, id) in order to establish a $V_{50}$ value. The fabric was impacted on both faces in order to determine if there existed a difference in ballistic resistance. The results of the impact test are reported in Table 1 below.

TABLE 1

| IMPACT SIDE | $V_{50}$ (ft/sec) | SEA(j · m²/kg) |
|---|---|---|
| ECPE | 1833 | 35.14 |
| Kevlar ® 29 | 1632 | 27.86 |

Figure 2:
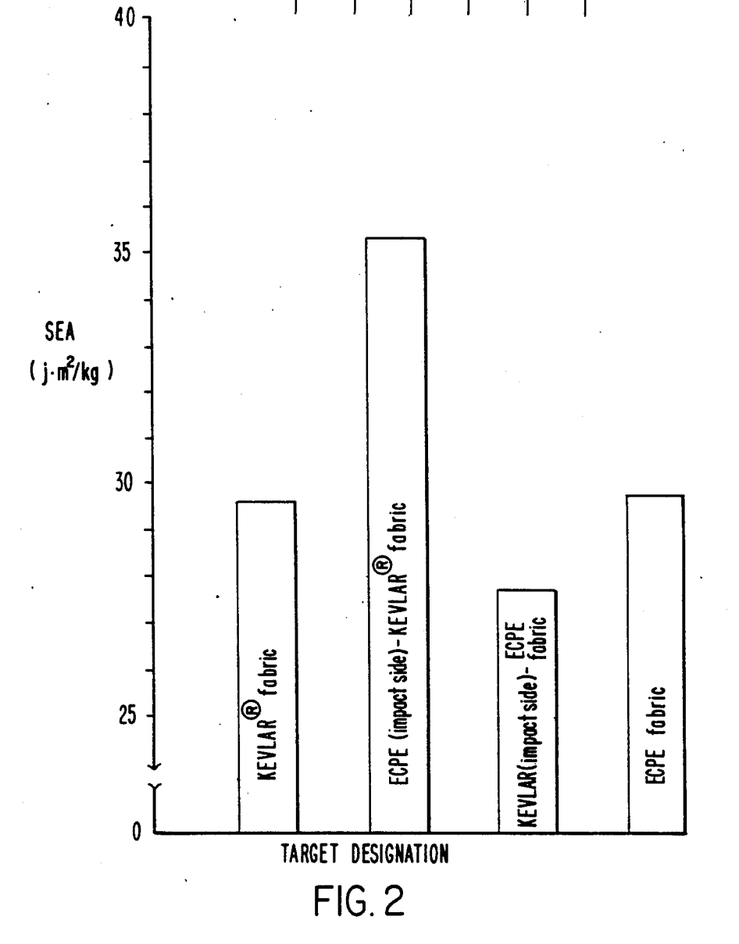
FIG. 2 graphically illustrates a comparison of the ballistic protection afforded by the multilayered articles described and tested in Example 5.

It is abundantly clear from Table 1 and FIG. 2 that the article constructed in accordance with applicants' invention offers superior ballistic resistance when employed in the manner discovered by applicants, i.e., with the layers having the lower resistance to fiber displacement (the ECPE layers) constituting the initial impact portion as compared to the ballistic resistance properties obtained when the article was impacted initially at the Kevlar ® layers.

A visual examination of the multilayered article was then performed. The results are reproduced in Tables 2 and 3 below.

TABLE 2

| | SHOT NO 2 $V_S = 1621$ Partial Penetration Broken Yarns | | SHOT NO 4 $V_S = 1805$ Partial Penetration Broken Yarns | | SHOT NO 5 $V_S = 1867$ Partial Penetration Broken Yarns | |
|---|---|---|---|---|---|---|
| LAYER Broken Yarns | Warp | Fill | Warp | Fill | Warp | Fill |
| ECPE | | | | | | |
| 1 | 2 | 2 | 1 | 3 | 2 | 2 |
| 2 | 1 | 2 | 2 | 1 | 2 | 2 |
| 3 | 0 | 0 | 1 | 3 | 1 | 3 |

TABLE 2-continued

| LAYER Broken Yarns | SHOT NO 2 $V_S = 1621$ Partial Penetration Broken Yarns | | SHOT NO 4 $V_S = 1805$ Partial Penetration Broken Yarns | | SHOT NO 5 $V_S = 1867$ Partial Penetration Broken Yarns | |
|---|---|---|---|---|---|---|
| | Warp | Fill | Warp | Fill | Warp | Fill |
| 4 | 0 | 1 | 0 | 2 | 1 | 2 |
| 5 | 0 | 0 | 0 | 2 | 1 | 1 |
| 6 | 1 | 1 | 1 | 1 | 2 | 1 |
| Total ECPE Broken Yarns | 10 | | 17 | | 20 | |
| Kevlar | | | | | | |
| 7 | 2 | 2 | 3 | 3 | 2 | 4 |
| 8 | 0 | 3 | 2 | 3 | 4 | 4 |
| 9 | Fragment | | 3 | 3 | 4 | 3 |
| 10 | Defeated | | 1 | 3 | 4 | 4 |
| 11 | | | 3 | 3 | 4 | 4 |
| 12 | | | 0 | 3 | 4 | 4 |
| 13 | | | 0 | 1 | 3 | 3 |
| 14 | | 0 | 1 | 5 | 2 | |
| 15 | | | Fragment Defeated | | 3 | 2 |
| Total Kevlar Broken Yarns | 7 | | 32 | | 58 | |

TABLE 3

| LAYER | SHOT NO 1 $V_S = 1537$ Partial Penetration Broken Yarns | | SHOT NO 5 $V_S = 1631$ Partial Penetration Broken Yarns | | SHOT NO 6 $V_S = 1716$ Complete Penetration Broken Yarns | |
|---|---|---|---|---|---|---|
| | Warp | Fill | Warp | Fill | Warp | Fill |
| KEVLAR | | | | | | |
| 1 | 5 | 3 | 3 | 5 | 4 | 5 |
| 2 | 5 | 3 | 3 | 5 | 4 | 5 |
| 3 | 5 | 2 | 2 | 5 | 3 | 5 |
| 4 | 4 | 3 | 3 | 4 | 3 | 5 |
| 5 | 4 | 2 | 3 | 3 | 2 | 5 |
| 6 | 4 | 2 | 3 | 2 | 3 | 4 |
| 7 | 1 | 1 | 3 | 3 | 3 | 4 |
| 8 | 1 | 0 | 2 | 1 | 3 | 3 |
| 9 | 0 | 0 | 1 | 0 | 3 | 4 |
| Total Kevlar Broken Yarns | 45 | | 50 | | 69 | |
| ECPE | | | | | | |
| 10 | 0 | 0 | 0 | 1 | 1 | 1 |
| 11 | 0 | 0 | 0 | 1 | 0 | 0 |
| 12 | Fragment | | 0 | 1 | 0 | 0 |
| 13 | Defeated | | 0 | 0 | 0 | 1 |
| 14 | | | Fragment Defeated | | 0 | 0 |
| 15 | | | | | 0 | 1 |
| Total ECPE Broken Yarns | 0 | | 3 | | 4 | |

From the visual inspection of the article, it appears that the increase in the $V_{50}$ value (ECPE layers as impact portion) was principally due to the increase in the number of extended chain of polyethylene fibers broken upon impact.

EXAMPLE 2

An 18 layer article constructed from the Kevlar ® 29 layers and the ECPE fiber layers described in Example 1 was tested and examined to develop an RIR value for the fabric. An examination of the first third (6 layers) of an 18 layer Clark-Schwebel Style 713 fabric for damage caused by a standard 22 caliber fragment (R. C. Laible, id) having an impact velocity of 1675 ft/sec. revealed that 44 yarns were broken of a possible 80 yarns within the area of impact. Thus, the value of F for layer of this construction is 0.54 as calculated from equation (1).

Similarly, an 18 layer extended chain polyethylene article was examined after impact by a 22 caliber fragment having a velocity of 1656 ft/sec. The first third (6 layers) of the article revealed that only 10 yarns were broken of a possible 72 yarns within the area of impact. Thus, the value for F under almost identical conditions as for the Kevlar ® 29-containing article was 0.14 as calculated from the equation (1).

An 18 layer article consisting of 9 layers of the extended chain polyethylene material adjacent 9 layers of the Clark-Schwebel Style 713 Kevlar ® 29 material was subjected to impact testing. Employing the Kevlar ® containing material as the initial impact side of the article, a $V_{50}$ value of 1668 ft/sec. was established. This value was lower than for either the Clark-Schwebel material or the extended chain polyethylene material (see Example 1). The RIR value for this article was 3.86.

Upon reversing the roles of the Kevlar ®-containing and ECPE containing materials (i.e., arraying the article such that the ECPE material functioned material as the initial impact side) a $V_{50}$ value of 1858 ft/sec. was established. This value was higher than for either the Kevlar ®-containing article or the ECPE-containing article and, more importantly, significantly higher than the $V_{50}$ value of the ECPE-Kevlar ® article, when subjected to impact initially at the Kevlar ®-containing material.

From these data, it is readily apparent that the ECPE-Kevlar multilayered article was constructed in accordance with applicants disclosure and, when employed in the manner discovered by applicants, yielded unexpectedly enhanced ballistic resistance properties.

EXAMPLE 3

A number of multilayered articles consisting essentially of 18 layers of varying percentages of extended chain polyethyelene layers and Clark-Schwebel Kevlar ® 29 Style 713 layers were subjected to impact tests. The ECPE fiber containing layers in each sample were plain woven layers having 28 ends/inch in both the warp and fill directions and were prepared from untwisted yarn sized with low molecular weight polyvinylalcohol on a Cromptom and Knowles box loom (After weaving, the sizing was removed by washing in hot water at between about 60° and 72° C.). The yarn used in each of the layers had 118 filaments, was of approximately 1200 denier, and exhibited a modulus of 1250 g/denier, a tenacity of 30 g/denier and an energy-to-break of 60 j/g. The Clark-Schwebel Style 713 layers of each article were constructed as described in Example 1. The results of the impact tests are reported in Table 4 below.

TABLE 4

| | $V_{50}$ Determination of ECPE and Kevlar Article Combinations | | | | | | |
|---|---|---|---|---|---|---|---|
| Initial Impact Surface | Consec. Layers ECPE | Consec. Layers Kevlar | Areal ECPE | Density Kevlar | (Kg/m$^2$) Total | $V_{50}$ (ft/sec) | SEA (J · M$^2$/kg) |
| ECPE | 9 | 9 | 2.4780 | 2.535 | 5.315 | 1858 | 33.24 |
| Kevlar | " | " | " | " | 5.315 | 1668 | 26.79 |

TABLE 4-continued

| | | $V_{50}$ Determination of ECPE and Kevlar Article Combinations | | | | | |
|---|---|---|---|---|---|---|---|
| Initial Impact Surface | Consec. Layers ECPE | Consec. Layers Kevlar | Areal ECPE | Density Kevlar | (Kg/m$^2$) Total | $V_{50}$ (ft/sec) | SEA (J·M$^2$/kg) |
| ECPE | 14 | 4 | 4.337 | 1.128 | 5.465 | 1841 | 31.74 |
| Kevlar | " | " | " | " | 5.465 | 1673 | 26.21 |
| ECPE | 4 | 14 | 1.229 | 3.917 | 5.146 | 1744 | 30.24 |
| Kevlar | " | " | " | " | 5.146 | 1686 | 28.27 |

From the above data, the article exhibiting the highest RIR value is the article consisting of 9 consecutive layers containing ECPE fiber and 9 consecutive layers of Kevlar ® 29 fiber. This article would be expected to, and in fact did, exhibit the most dramatic effects when subjected to ballistic impact tests. More specifically, when utilized according to applicants discovery (i.e., using the lower RI portion as the initial impact surface), the ballistic resistance of the article was clearly superior to the other combinations. Also, it is apparent that the degree of enhancement of ballistic resistance from using the lower RI value portion as the initial impact side decreases as the RIR value decreases. Moreover, employing the ECPE-Kevlar ® fiber containing article as a ballistic article in accordance with applicants' discovery clearly yielded ballistic resistance properties superior to the properties of either a multilayered Kevlar ®-29 fiber containing article or an ECPE fiber containing article.

EXAMPLE 4

A multilayered article was constructed in accordance with applicants' invention from the following layers arranged in the order recited below: 12 layers of non-crimped ECPE fiber, to produce layers containing 24×24 ends/inch and knitted together by a low denier (approximately 200 denier) polyethylene teraphthalate yarn constituting approximately 6% by weight of the fabric, and having a total areal density of 3.455 kg/m$^2$; 5 layers of plain woven ECPE fiber, each layer constructed as in Example 1 and modified by soaking overnight in a toluene solution of Kraton G1650 and then drying in a fume hood (to allow solvent to evaporate), to yield a fabric having 9.5% by weight coating, a fiber areal density of 1.7115 and a total (fiber and coating) areal density of 1.892; 6 layers of plain woven ECPE fiber, each layer constructed as in Example 1, and coated with 12% by weight Kraton G1650 to yield a fiber areal density of 1.972 and a total areal density of 2.414. The 23 layer article had a fiber areal density equal to 7.129 kg/m$^2$ and a total areal density of 7.581 kg./m$^2$. The article was subjected to ballistic impact at both faces to establish $V_{50}$ values and SEA values for the fiber and the article. The results of the tests are reported in Table 5 below.

TABLE 5

| | ECPE Non-Crimped Impact Side | ECPE-12% Kraton G1650 Impact Side | Kevlar ® 29 Fabric |
|---|---|---|---|
| Yarn areal density (kg/m$^2$) | 7.137 | 7.137 | 7.126 |
| Total areal density (kg/m$^2$) | 7.581 | 7.581 | 7.126 |
| $V_{50}$ (ft/sec.) | 2055 | 1824 | 1927 |
| SEA article (J · m$^2$/kg) | 30.3 | 23.9 | 26.6 |
| SEA total (J · m$^2$/kg) | 28.50 | 22.5 | 26.6 |

From these data, it readily apparent that constructing an article as disclosed by applicants' and utilizing the article as disclosed by applicants produces an unexpectedly superior ballistic resistant product. More specifically, employing the non-crimped, non-coated ECPE fiber containing layers as the initial impact layers yielded a $V_{50}$ for the article and SEA values for the fibers and the article which were substantially superior to the impact resistance of the article when employed in the reverse and substantially superior to the impact resistance of a multilayered article contructed of the same yarn areal density and consisting solely of Kevlar ®-29 yarn.

EXAMPLE 5

A multilayered article constructed in accordance with applicants' invention and consisting of 9 layers of Clark-Schwebel Style 713 Kevlar ® 29 material and 7 layers of noncoated, non-crimped, extended chain polyethylene fiber containing material constructed as in Example 4 was subjected to ballistic impact testing. From the data in Table 6 below, a dramatic increase in ballistic effectiveness is achieved when the extended chain polyethylene fiber-containing layers are arranged as the inital impact layers as compared to the use of the article in reverse and also as compared to a multilayered fabric consisting essentially of the Clark-Schwebel Style 713 Kevlar ® material.

TABLE 6

| | AREAL DENSITY (kg/m$^2$) | | | | |
|---|---|---|---|---|---|
| Impact Side | Kevlar | Non-Crimped ECPE Fabric | Total | $V_{50}$ (ft. per) | SEA (J · m$^2$/kg) |
| Kevlar | 5.210 | 0 | 5.210 | 1739 | 29.68 |
| ECPE | 2.531 | 2.460 | 4.991 | 1838 | 34.64 |
| Kevlar | 2.531 | 2.460 | 4.991 | 1438 | 21.20 |

EXAMPLE 6

Nine layers consisting of an extended chain polyethylene fiber were prepared in a plain weave construction. The yarn utilized was 203 denier composed of 19 filaments, with a modulus of 1304 g/denier, a tenacity of 28.4 g/denier, and an energy-to-break of 47 g/denier (each layer consisted of 70 ends/inch in both the warp and fill direction). Four of the layers were soaked overnight in a toluene solution of Kraton D1107 (50 g/L) (Kraton D1107 is a commercial product of the Shell Chemical Company, and is a triblock copolymer of the structure polystyrene-polyisoprene-polystyrene having 14 weight percent polystrene block) and then hung in a fume hood to allow solvent evaporation, resulting in layers containing 6% by weight of Kraton coating. A 9 layer target was constructed from the materials produced above with the 5 uncoated layers arranged consecutively (with an areal density of 0.667) followed by the 4 coated layers (to yield a total article areal density of 1.37). The fabric was evaluated against 22 caliber lead bullets using the procedure designated in Law Enforcement Standard NILECJ-STD-0101.01, in which the fabric is backed by clay. In order to pass this standard, the bullet must not penetrate the fabric and must not cause an indentation into the clay backing of more than 1.73 inches. Data shown below indicates that when the Kraton-coated layers are remote from the initial impact side, the target easily passes the test but fails when the article is reversed. (See Table 7 below).

TABLE 7

| | Bullet | | |
|---|---|---|---|
| Impact Side | Velocity (ft/sec) | Target Response | Indentation (inches) |
| ECPE | 1054 | P | .65 |
| uncoated | 1078 | P | .70 |
| ECPE | 1072 | C | — |
| coated | 1064 | C | — |

NOTE:
P - partial target penetration
C - complete target penetration

EXAMPLE 7

Another embodiment of applicants invention was tested. A combination of extended chain polyethylene fiber contains layers (constructed as described in Example 1) and layers of ballistic nylon (Style 000-26042 Burlington Industries), was produced. The ballistic nylon layers were plain woven layers having 33 ends/inch in both the warp and fill directions. The results of ballistic tests on the article are reported in Table 8 below as are the results of ballistic tests with an article constructed solely from the nylon layers described above.

TABLE 8

| Fabric on Impact Side | Areal Density (kg/m$^2$) | | | V$_{50}$ (ft/sec) | SEA (J · m$^2$/kg) |
|---|---|---|---|---|---|
| | A-900 | Nylon | Total | | |
| ECPE | 2.748 | 2.385 | 5.133 | 1684 | 28.3 |
| Nylon | " | " | " | 1505 | 22.6 |
| Nylon | — | 4.761 | 4.761 | 1462 | 23 |

Note specifically the dramatic change in the SEA values as between the ECPE-nylon article results depending upon the construction of the initial side, and the dramatic improvements of the SEA values of the ECPE- nylon article when the ECPE layers act as the impact side as compared to the fabric consisting essentially of ballistic nylon. This example also again illustrates the improved effect of employing ECPE fiber-containing layers in combination with layers formed from different fiber compositions.

We claim:

1. An article of manufacture comprising a plurality of first flexible layers arranged in a first portion of said article each of said first flexible layers consisting essentially of uncoated fibers comprising fiber selected from the group of polyolefin fibers, polyvinyl alcohol fibers and polyacrylonitrile fibers having a tensile modulus of at least 300 g/denier and a tenacity of at least about 15 g/denier and a plurality of second flexible layers arranged in a second portion of said article, each of said second flexible layers consisting essentially of uncoated fibers, the resistance to displacement of fibers in each of said second flexible layers being greater than the resistance to displacement of fibers in each of said first flexible layers.

2. The article of manufacture of claim 1 wherein each of the first flexible layers comprises polyethylene fibers of a weight average molecular weight of at least about 500,000 and a tensile modulus of at least about 500 g/denier.

3. The article of manufacture of claim 1 wherein each of the second flexible layers comprises polyethylene fibers having a weight average molecular weight of at least about 500,000, a tensile modulus of at least about 500 g/denier and a tenacity of at least about 15 g/denier.

4. The article of manufacture of claim 1 wherein each of the first flexible layers consists of polyethylene fibers having a tensile modulus of at least about 1,000 g/denier and a tenacity of at least 20 g/denier.

5. The article of manufacture of claim 4 wherein each of the second flexible layers consists of polyethylene fibers having a tensile modulus of at least about 1,000 g/denier and a tenacity of at least about 20 g/denier.

6. The article of manufacture of claim 1 wherein each of the second flexible layers consists of uncoated fibers having a cross sectional aspect ratio greater than about 5:1.

7. The article of manufacture of claim 1 wherein each of the second flexible layers consists of fibers of a denier less than the lowest denier of fiber contained in each of the first flexible layers.

8. The article of manufacture of claim 1 wherein the areal density of the fiber in each of the first flexible layers is less than the areal density of fiber in each of the second flexible layers.

9. The article of manufacture of claim 1 wherein there are at least two first flexible layers and at least two second flexible layers.

10. The article of manufacture of claim 2 wherein at least one of the plurality of second flexible layers comprises aramid fibers.

11. The article of manufacture of claim 1 wherein the plurality of first flexible layers comprise fiber having a modulus higher than the modulus of the fibers contained in each of second flexible layers.

12. The article of manufacture of claim 1 wherein each of the first flexible layers are non-woven fiber layers and wherein each of the plurality of second flexible layers are woven fiber layers.

13. The article of manufacture of claim 1 wherein the plurality of the second flexible layers are stitched together.

14. A ballistic-resistant article comprising the article of manufacture of claim 1 wherein the plurality of first flexible layers are arranged to receive an impact from a ballistic threat prior to said plurality of second flexible layers.

15. The ballistic-resistant article of claim 14 wherein the plurality of first and second layers comprise at least about 30% of the areal density of the article.

16. An article of manufacture comprising a plurality of first flexible layers arranged in a first portion of said article, each of said first flexible layers comprising polyethylene fibers having a weight average molecular weight of at least about 500,000, a modulus of at least about 500 g/denier and a tenacity of at least about 15 g/denier, and a plurality of second flexible layers arranged in a second portion of said article, each of said second flexible layers being substantially free of polyethylene fiber, the resistance to displacement of fibers in each of said second flexible layers being greater resistance to displacement of fibers in each of said first flexible layers.

17. The article of manufacture of claim 16 wherein each of the second flexible layers comprises aramid fibers having a modulus of at least about 500 g/denier.

18. The article of manufacture of claim 17 wherein each of the first flexible layers comprises polyethylene fibers having a tensile modulus of at least about 1,000 g/denier and a tenacity of at least about 20 g/denier.

19. The article of manufacture of claim 16 wherein the areal density of the fiber comprising the plurality of the first flexible layers is substantially equal to the areal density of the fiber in the plurality of second flexible layers.

20. The article of manufacture of claim 16 wherein there are at least two first flexible layers and at least two second flexible layers.

21. The article of manufacture of claim 16 wherein at least one of the plurality of second flexible layers comprises aramid fibers.

22. The article of manufacture of claim 16 wherein the first flexible layers comprise fiber having a modulus higher than the modulus of the fiber comprising each of the second flexible layers.

23. The article of manufacture of claim 16 wherein each of the first flexible layers are non-woven fiber containing layers and wherein each of the plurality of said second flexible layers are woven fiber containing layers.

24. A ballistic resistant article comprising the article of manufacture of claims 16 wherein the plurality of first flexible layers are arranged to receive an impact from a ballistic threat prior to said plurality of second flexible layers.

25. An article of manufacture comprising a plurality of first flexible layers arranged in a first portion of said article, at least one of said first flexible layers consisting essentially of uncoated fiber selected from the group of polyolefin fiber, polyvinyl alcohol fiber, polyacrylonitrile fiber and mixtures thereof, at least some of said fiber having a tensile modulus of at least about 300 g/denier and a tenacity of at least about 15 g/denier, and a plurality of second flexible layers arranged in a second portion of said article, at least one of said second flexible layers comprising fiber selected from the group of polyolefin fiber, polyvinyl alcohol fiber, polyacrylonitrile fiber and mixtures thereof and a material selected from the group of polymers having ethylene or propylene crystallinity, polymers having a modulus of less than about 6,000 psi, and mixtures thereof, the resistance to displacement of fibers in each of said second flexible layers being greater than the resistance to displacement of fibers in each of said first flexible layers.

26. The article of manufacture of claim 25 wherein the fibers of at least one of said first flexible layer has a weight average molecular weight of at least about 500,000, a modulus of at least about 500 g/denier and a tenacity of at least about 15 g/denier.

27. The article of manufacture of claim 26 wherein the fibers of said first and second portions comprise polyethylene fibers.

28. The article of manufacture of claim 25 wherein each of the first flexible layers consists essentially of uncoated polyolefin fiber having a weight average molecular weight of at least about 500,000, a modulus of at least about 500 g/denier and a tenacity of at least about 15 g/denier.

29. The article of manufacture of claim 25 wherein each of the second flexible layers comprises polyolefin fiber having a weight average molecular weight of at least about 500,000, a modulus of at least about 500 g/denier and a tenacity of at least about 15 g/denier.

30. The article of manufacture of claim 27 wherein each of the second flexible layers consists of polyethylene fiber and a material selected from the group of polymers having ethylene or propylene crystallinity, polymers having a modulus of less than about 6,000 psi, and mixtures thereof.

31. The article of manufacture of claim 27 wherein the material is a coating applied to the fibers, the amount of coating material constituting not more than about 200 percent by weight of the fiber.

32. The article of manufacture of claim 27 wherein the material is a matrix material, the amount of matrix material constituting not more than about 70 percent by volume of the layer.

33. The article of manufacture of claim 27 wherein the material is a matrix material, the amount of matrix material constituting not more than about 40 percent by volume of the layer.

34. The article manufacture of claim 25 wherein there are at least two flexible layers and at least two second flexible layers.

35. A ballistic resistant article comprising the article of manufacture of claim 25 wherein the plurality of first flexible layers are arranged to receive an impact from a ballistic threat prior to said plurality of second flexible layers.

36. An article of manufacture comprising a plurality of flexible, fiber-containing layers, said article having an RIR value of at least about 1.25, wherein the RIR value is the value of $RI_1$ divided by $RI_2$ where $RI_1$ is equal to the higher resistance index, RI, valve and $RI_2$ is the lower resistance index, RI, value, the resistance index RI being determined as $$RI = \sum_{i=1}^{i=n} F_i AD_i$$

where n=number of consecutive impact effective layers (beginning with the first impact effective layer nearest a face of the article) constituting substantially one half of the areal density of all of the impact effective layers of the article, an impact effective layer being defined as any fiber containing layer of said article wherein said fibers consist of fibers having a tenacity of at least about 15 g/denier and any fiber containing layer of said article having a specific energy absorption value of at least about one third of the highest specific energy absorption value calculated for any layer of the article; $F_i$ is equal to the resistance to fiber displacement value of the $i^{th}$ layer; and $AD_i$ is equal to the areal density of the $i^{th}$ layer, $F_i$ being determined by the equation $$F = \frac{\sum_{i=1}^{i=n} b_i}{nx}$$

where $b_i$=the number of broken fibers in the $i^{th}$ layer produced by the impact of a ballistic threat having an impact velocity of at least about 90 percent of the $V_{50}$ value of an article constructed essentially from 3n $i^{th}$ layers, n=the number of layers removed and individually inspected to determine the number of broken fibers in each layer i=1 to i=n, and x=the number of fibers within the impact area of each layer i=1 to i=n, the impact area being defined as as area of the layer substantially equal to the initial cross sectional area of the ballistic threat (measured in a plane normal to the direction of travel of the ballistic threat).

37. The article of manufacture of claim 36 wherein RIR is at least about 2.

38. The article of manufacture of claim 36 wherein the RIR is at least about 3.

39. The article of manufacture of claim 36 wherein a portion of the article having the $RI_1$ value constitutes the initial impact portion of the article.

40. A ballistic resistant article comprising the article of manufacture of claim 37 wherein a portion of the article of manufacture having the $RI_1$ value is arranged to receive an impact from a ballistic threat prior to the portion of the article of manufacture having the $RI_2$ value.

41. A ballistic resistant article comprising the article of manufacture of claim 38 wherein a portion of the article of manufacture having the $RI_1$ value is arranged to receive an impact from a ballistic threat prior to the portion of the article of manufacture having the $RI_2$ value.

42. An article of manufacture comprising a plurality of fiber containing layers, each fiber containing layer having an F value different from any other of said fiber containing layers, wherein $$F = \frac{\sum_{i=1}^{i=n} b_i}{nx}$$

where $b_i$=the number of broken fibers in the $i^{th}$ layer produced by the impact of a ballistic threat having an impact velocity of at least about 90 percent of the $V_{50}$ value of an article constructed essentially from 3n $i^{th}$ layers, n=the number of layers removed and individually inspected to determine the number of broken fibers in each layer 1 through n, and x=the number of fibers within the impact area of each layer 1 through n, the impact area being defined as as area of the layer substantially equal to the initial cross sectional area of the ballistic threat (measured in a plane normal to the direction of travel of the ballistic threat).

43. An article of manufacture as in claim 42 or in that the layers are arranged in increasing F value from one side of the article to the other.

44. A ballistic resistant article comprising the article of manufacture of claim 43 wherein the layer having the lowest F value is arranged to receive the impact of a ballistic threat prior to the layer having the largest F value of the article of manufacture.

45. An article of manufacture comprising a plurality of first layers arranged in a first portion of said article, each of said first layers consisting essentially of polyolefin fiber, and a plurality of second layers, each of said second layers comprising fiber, the fiber in said second layers having a greater resistance to displacement than the fiber in said first layers, the fiber of said second layers consisting of polyethylene fiber having a weight average molecular weight of at least about 500,000, a modulus of at least about 500 g/denier, a tenacity of at least about 25 g/denier, and a denier no greater than about 50% of the fiber denier of said polyolefin fiber and not greater than about 500.

46. The article of manufacture of claim 45 wherein the second layers comprises layers consisting of said polyethylene fiber coated with or embedded in a material having a modulus of less than about 6000 psi.

47. The article of claim 45 wherein the first layers consist of fiber having a denier of at least about 1000 and wherein the fiber in said second layers consists of fiber having a denier of less than about 300.

* * * * *